United States Patent

Marugg

[11] Patent Number: 5,873,562
[45] Date of Patent: Feb. 23, 1999

[54] CONTROL APPARATUS FOR CONTROLLING GAS FLOW IN A MOLECULAR REGION

[75] Inventor: Leo Marugg, Sennwald, Switzerland

[73] Assignee: VAT Holding AG, Haag, Switzerland

[21] Appl. No.: 592,983

[22] Filed: Jan. 29, 1996

[51] Int. Cl.[6] ........................................ F16K 1/20
[52] U.S. Cl. ............................ 251/301; 138/46
[58] Field of Search .................... 251/205, 301, 251/302; 138/46

[56] References Cited

U.S. PATENT DOCUMENTS

| 3,045,706 | 7/1962 | Dillon | 251/301 X |
| 3,190,305 | 6/1965 | Schulze | 138/46 X |
| 4,373,546 | 2/1983 | Krakovsky | 251/301 X |
| 4,512,547 | 4/1985 | Balch | 251/301 X |

FOREIGN PATENT DOCUMENTS 1675521  1/1970  Germany ................................ 251/301

*Primary Examiner*—John Rivell
*Attorney, Agent, or Firm*—Anderson, Kill & Olick, P.C.

[57] ABSTRACT

A control apparatus for controlling gas flow in a molecular region including a housing, having a through-channel, and a control plate displaceable in its plane between an open position, in which the plate is located sidewise of the through-channel, and a closed position, in which the control plate crosses the through-channel, the control plate having a circumferential edge at least a portion of which is received in a groove circumscribing the through-channel, with the received portion having a profile which is offset backward or projects out with respect to the cross-sectional profile of the through-channel, and with the received portion having a diminished cross-sectional profile in comparison with the remaining edge portion.

5 Claims, 4 Drawing Sheets

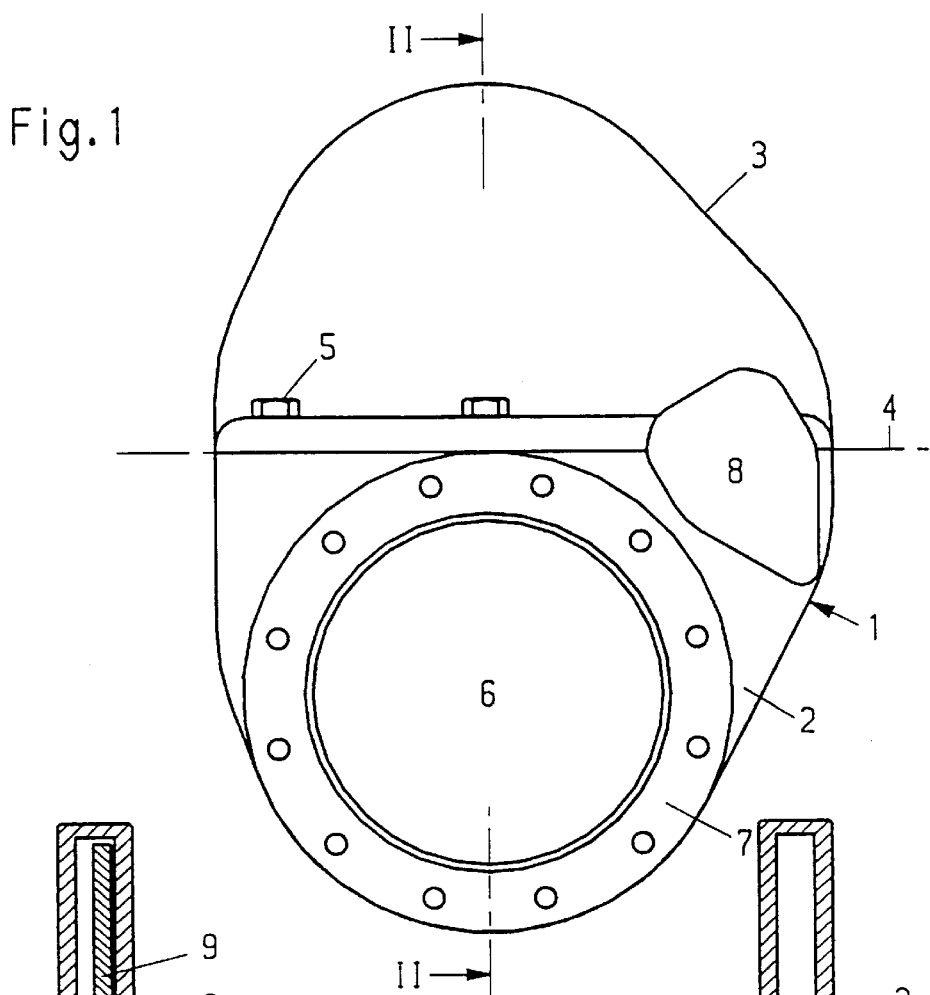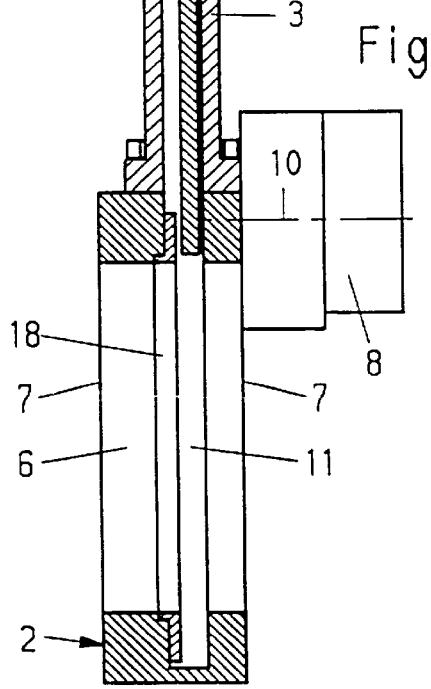

CONTROL APPARATUS FOR CONTROLLING GAS FLOW IN A MOLECULAR REGION

BACKGROUND OF THE INVENTION

The present invention relates to a control apparatus for controlling gas flow in a molecular region and including a housing having a through-channel and a groove circumscribing the through-channel along a predetermined circumferential extent of the through-channel, and a control plate displaceable in its plane between an open position, in which the plate is located sidewise of the through-channel, and a closed position, in which the control plate crosses the through-channel, which control plate has a circumferential edge at least a portion of which is received in the circumscribing groove in the closed position of the control plate.

The molecular gas flow takes place in a vacuum region with a pressure of 10-6 bar of lower. The molecular gas flow also plays a certain role in the transient region, the pressure in which is below 10-3 bar. The region of the molecular gas flow is characterized in that the mean free path lengths of the molecules are inversely proportional to the pressure. The mean free path lengths is a measure of probability of a collision of a molecule with another molecule of its environment. The mean free path lenghts define paths of separate molecules between two collisions. The mean free path lengths are rather substantial in the above-mentioned vacuum region.

In the material processing technology, there exists a need to control or regulate such a molecular gas flow and as continuously as possible over a large region. However, up to the present, all attempts to control the molecular gas flow did not bring the desired results.

Accordingly, an object of the invention is to provide a control apparatus for controlling gas flow in a molecular region which would insure a continuous control of a molecular gas flow over a large region.

SUMMARY OF THE INVENTION

This and other objects of the invention, which will become apparent hereinafter, are achieved by forming the edge portion of the control plate, which is received in the groove circumscribing the through-channel, so that it has a profile, which deviates from the cross-sectional profile of the through-channel and is offset backward or projects out relative to the cross-sectional profile of the through-channel.

According to another aspect of the present invention, the edge portion of the control plate, which is received in the circumscribing groove, has a reduced or tapered cross-sectional profile, preferably, wedge-shaped.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 shows an elevational view of a first embodiment of a control apparatus according to the present invention;

FIG. 2 shows a longitudinal cross-sectional view along line II—II in FIG. 1 in an open position of the control apparatus;

FIG. 3 shows a longitudinal cross-sectional view similar to that of FIG. 2 but in a closed position of the control apparatus;

DESCRIPTION OF THE PREFERRED EMBODIMENTS

Figure 4:
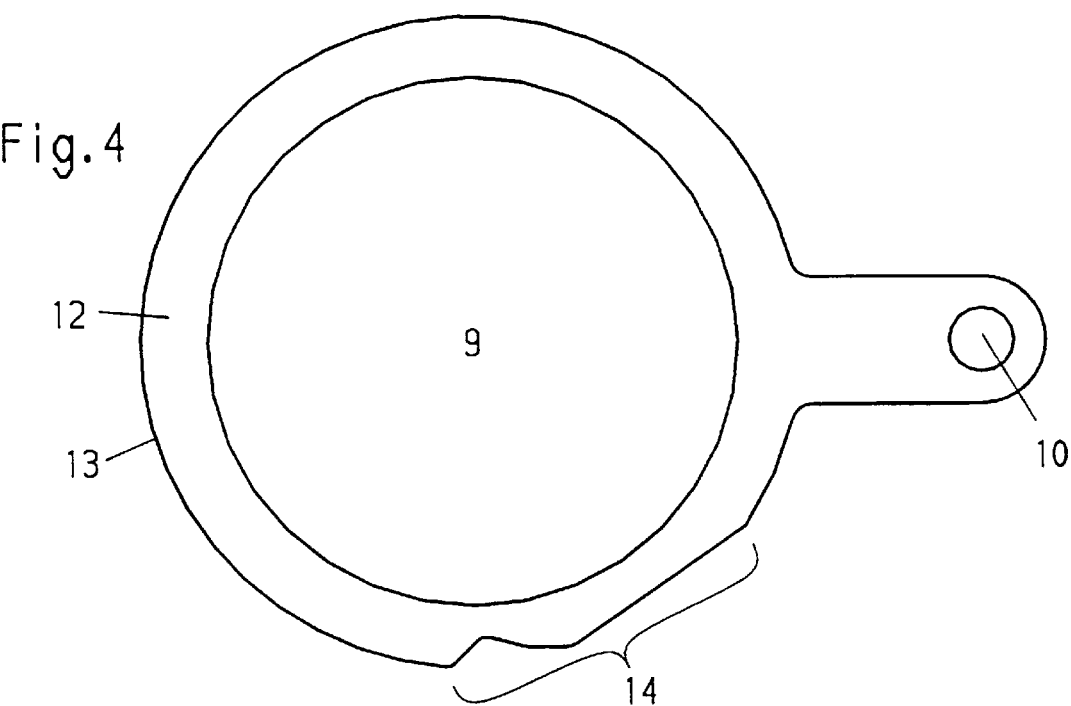
FIG. 4 shows a plan view of the control plate of a control apparatus according to the present invention.

The control apparatus for controlling gas flow in a molecular region according to the present invention, which is shown in FIG. 1, includes a housing 1 formed of lower and upper housing parts 2 and 3 fixedly but releasably connected with each other along a separation plane 4 by bolts 5. The lower housing part 2 has a through-channel 6. On opposite sides of the lower housing part 2, there are provided, respectively, connection flanges 7. An adjusting motor 8 is flange-mounted on the housing 1. The adjusting motor 8 is designed for pivoting a control plate 9, which is shown in FIG. 4, between its open and closed positions. In its open position, the control plate 9 is located in the upper housing part 3 (FIG. 2), and in the closed position, the control plate 9 is located in the region of the flow channel 6 (FIG. 3). In the disclosed embodiment, the control plate 9 pivots between its upper and lower or open and closed positions about an axis 10. In the embodiment of the control apparatus shown in FIG. 1, the through-channel 6 has a circular cross-section. The lower housing part 2 has a groove 11 circumscribing the through-channel 6 along a greater part of its circumference. The groove 11 receives the rim 12 of the control plate 9 is in its closed position.

Figure 5:
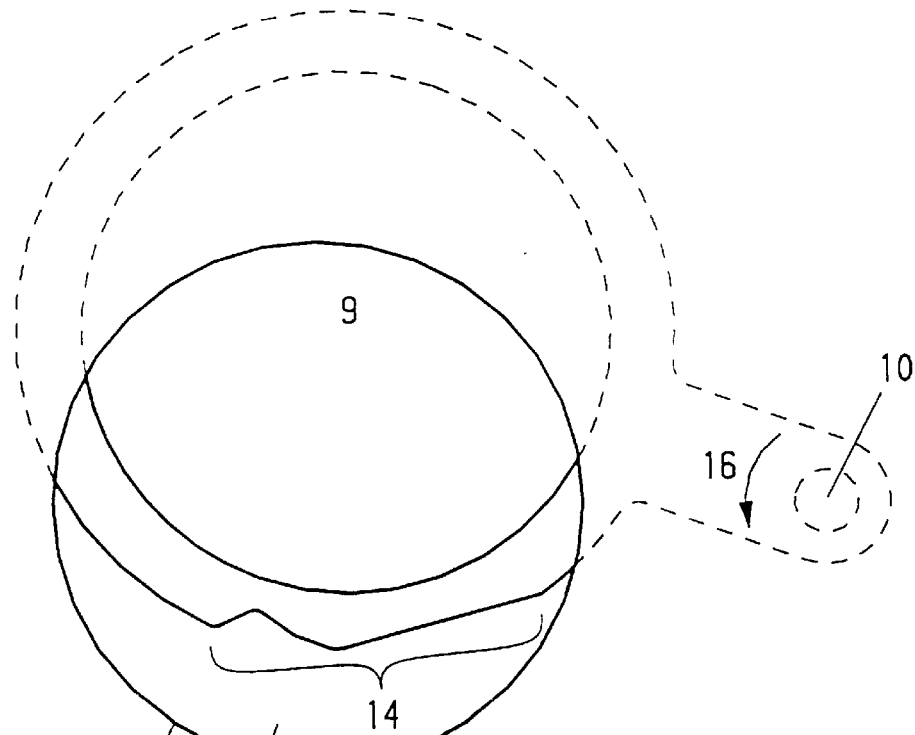
FIG. 5 shows schematically a plan view of the control plate in its closed position.

A characteristic feature of the control plate 9, which is shown in FIG. 4, consist in that the edge profile 13 of the control plate 9 is not continuously uniform along its circumference. Rather, the edge profile 13 has, in its region extending into the through-channel 6, when the control plate 9 moves into its closed position, and received in the groove 11 in the closed position of the control plate 9, a shaped portion 14 which deviates from a cross-sectional profile 15 of the through-channel 6 and is offset backward relative thereto. As can be seen in FIG. 5, which schematically shows the cross-sectional profile 15 of the through-channel 6 and the control plate 9 in its closed position according to FIG. 3, with the control plate 9 being movable into its closed position along the arrow 16, the flow cross-section 17 is limited by an irregular contour which partially deviates from a regular circular profile.

The shaped portion 14, as seen in FIGS. 4–5, consists of several rectilinear parts extending at an angle to each other. The shaped portion can also be formed of several arcuate parts or a combination of rectilinear and arcuate parts. A shaped potion of the edge profile of the control plate, which consists of rectilinear and/or arcuate parts, has at least one axis of symmetry.

Figure 8:
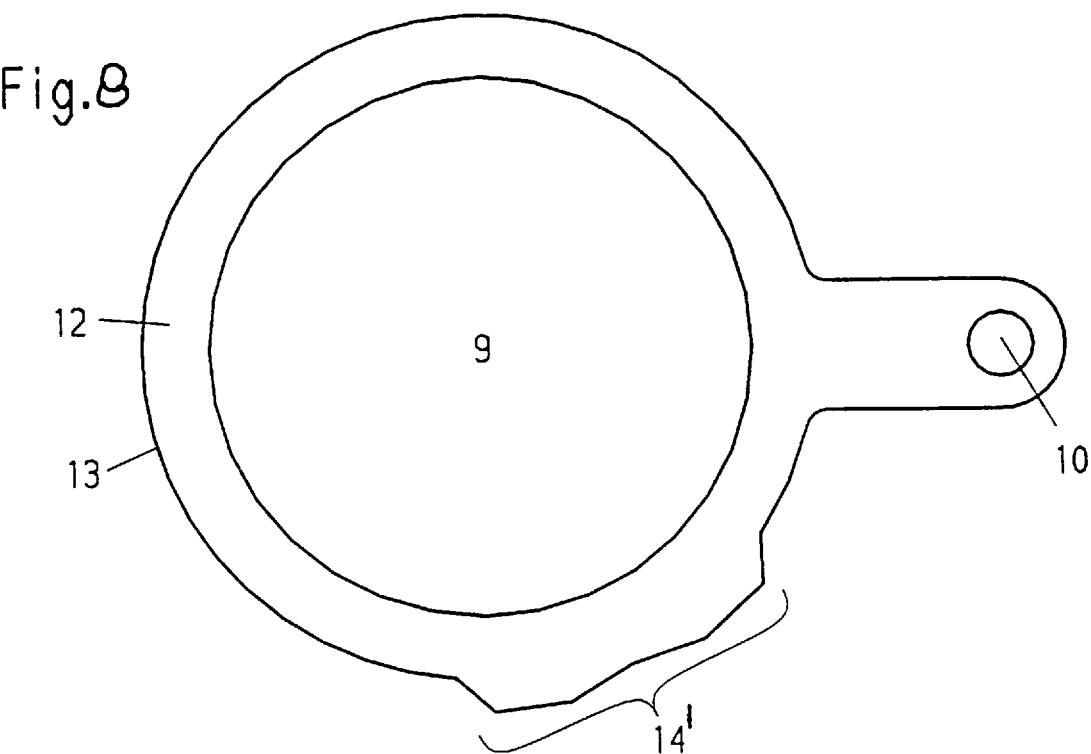
FIG. 8 shows a control plate of the second embodiment of a control apparatus according to the present invention.
Figure 9:
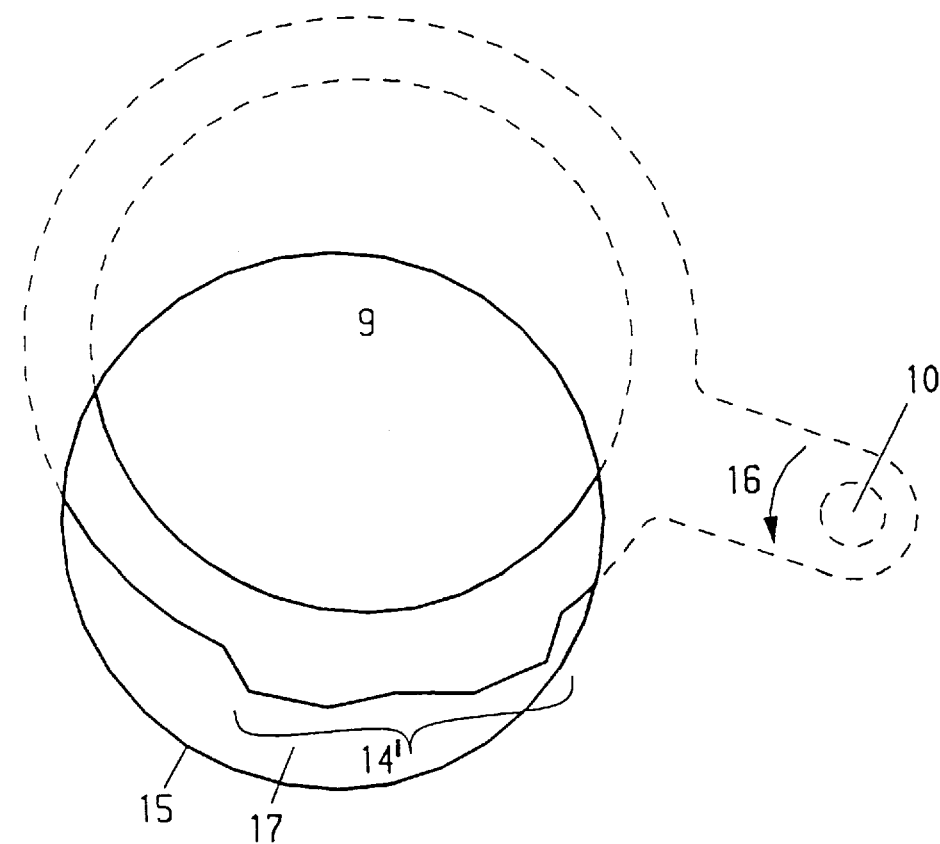
FIG. 9 shows a schematic view of the control plate shown in FIG. 8 in a closed position thereof.

A shaped portion 14' having a contour different from that of the shaped portion 14 shown in FIG. 2, is shown in FIGS. 8–9 and is formed of several rectilinear portions extending at angle to each other and having substantially the same length, whereas the shaped portion 14, which is shown in FIGS. 4–5, is formed of portions having substantially different lengths.

The extent, with which the shaped portions 14 and 14' are offset with respect to the regular circular profile, depends on the designated use of the control apparatus and on the pressure region in which the control apparatus is designed to operate. The profile of the shaped portion is always adapted to the designated use of the control apparatus.

Figure 6:
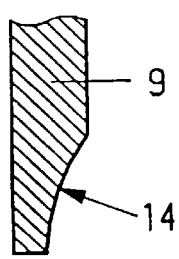
FIG. 6 shows a detail of a second embodiment of a control apparatus according to the present invention.
Figure 7:
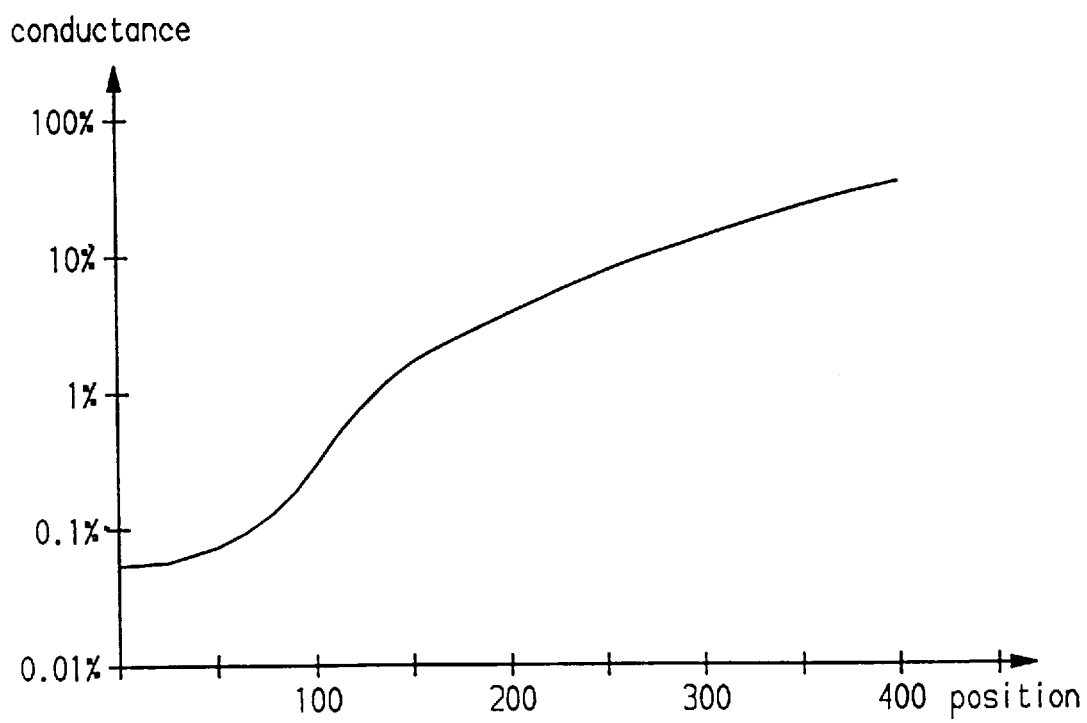
FIG. 7 shows a control diagram of the control apparatus shown in FIGS. 1–5.

Practical experiments conducted with the control apparatus of FIGS. 1–5 showed that it exhibits a control characteristic, which is schematically shown in FIG. 7, in which the rotational or pivotal speed (along the arrow 16) of the control plate 9 is plotted on the abscise axis, and the flow rate (liter/sec), in per cents, is plotted on the ordinate axis. Surprisingly, it was found out that a substantially continuous control characteristic is then achieved when the section of at least that edge region of the control plate 9 which extends into the through-channel 6, during movement of the control plate 9 to its closed position, and is received in the groove 11, upon the control plate reaching its closed position, tapers at least in some points relative to the remaining edge region of the control plate 9. This tapering of the edge region is shown in FIG. 6. The tapering section, as shown in FIG. 6, has a wedge-like cross-section. This tapering section extends over the same edge region of the control plate 9, which is designated in FIGS. 4–5 and 8–9 with reference numerals 14 and 14', respectively, and represents the edge region of the control plate 9 which is received in the groove 11.

Thus, according to the present invention, it is contemplated providing a shaped profile of the control plate such that it is offset relative to the cross-sectional profile of the through-channel so that it extends backward or projects out relative to the cross-sectional profile of the channel, and in addition, has a tapering cross-section.

A control apparatus of the above-described type can also have sealing functions when the circumferential region of the through-channel, channel which forms the groove 11 for receiving the rim 12, is formed as a valve seat 18 which is sealingly engaged by the control plate 9 in its closed position.

Such valve seats are per se known and are disclosed in German publications DE-GM 77 31 993, DE-OS 34 47 008, DE-PS 12 64 191 and in U.S. Pat. No. 3,145,969 which is incorporated herein by reference thereto.

As it has already been discussed above, the control plate 9 pivots in its plane about the axis 10. The present invention is also applicable to a control plate displaceable linearly in its plane. A linearly displaceable control plate would likewise have a rim which upon displacement of the control plate 9 toward its closed position, would extend into the channel and would be received in a groove provided in the housing when the control plate reaches its closed position. This rim also would have a shaped edge portion as discussed above.

In the disclosed embodiments, both the cross-sectional profile 15 of the through-channel 16 and that of the control plate 9 are circular. However, a control apparatus with a rectangular cross-section of the through-channel can also be used. In this case, the control plate likewise will have a rectangular cross-section. The present invention is also applicable to such a control apparatus. In all cases, the control characteristic shown in FIG. 7 is defined by the edge profile which is adapted to respective processes and operational conditions.

The shape of the profile 14 is determined by specific characteristics of the molecular gas flow which completely differ from those of a laminar gas flow.

Through the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A control apparatus for continuously controlling gas flow in a molecular region, said control apparatus comprising:

a housing having a through-channel and a groove circumscribing the through-channel along a predetermined circumferential extent of the through-channel; and a control plate displaceable in a plane thereof between an open position, in which the plate is located sidewise of the through-channel, and a closed position, in which the control plate crosses the through-channel, the control plate having circumferential edge at least a portion of which is received in the circumscribing groove in the closed position of the control plate, wherein the edge portion of the control plate received in the circumscribing groove has a reduced thickness in comparison with the thickness of a remaining edge portion and tapers at least in some points with respect to the remaining edge portion of the control plate.

2. A control apparatus as set forth in claim 1, wherein the tapered portion has a wedge-like cross-section.

3. A control apparatus as set forth in claim 1, wherein the tapered portion has a wedge-like cross-section.

4. A control apparatus for continuously controlling gas flow in a molecular region, said control apparatus comprising:

a housing having a through-channel and a groove circumscribing the through-channel along a predetermined circumferential extent of the through-channel; and a control plate displaceable in a plane thereof between an open position, in which the plate is located sidewise of the through-channel, and a closed position, in which the control plate crosses the through-channel, the control plate having a circumferential edge at least a portion of which is received in the circumscribing groove in the closed position of the control plate;

wherein the edge portion of the control plate received in the circumscribing groove has a shaped profile which deviates from a cross-sectional profile of the through-channel and is one of offset backward and projecting out relative to the cross-sectional profile of the through-channel to provide for a predetermined control of the gas flow through the through-channel in a closed position of the control plate; and wherein the shaped profile is formed of a plurality of rectilinear sections extending at an angle to each other.

5. A control apparatus as set forth in claim 4, wherein the edge portion of the control plate received in the circumscribing groove has at least one axis of symmetry.

* * * * *